No. 838,472. PATENTED DEC. 11, 1906.
H. M. SMITH.
ADJUSTABLE BEARING FOR LEATHER SPLITTING MACHINES.
APPLICATION FILED MAY 18, 1906.
2 SHEETS—SHEET 1.
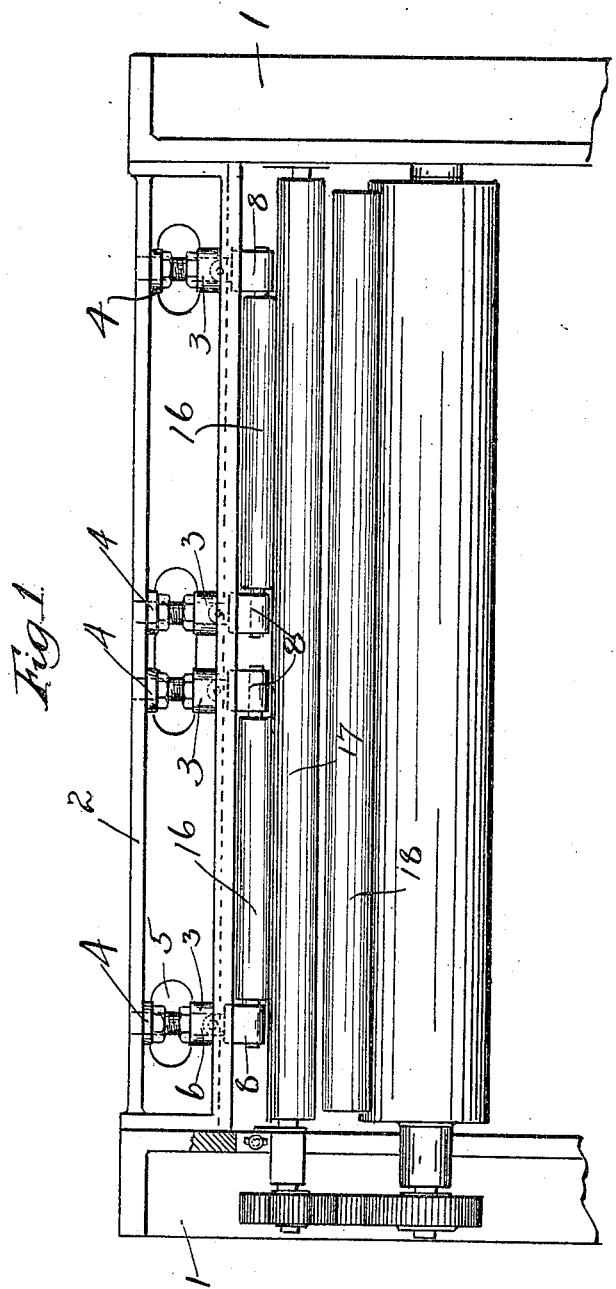
Witnesses
E. D. Ogden
A. L. Makepeace
Inventor
Henry M. Smith.
By
Howard E. Barlow.
Attorney No. 838,472. PATENTED DEC. 11, 1906.
H. M. SMITH.
ADJUSTABLE BEARING FOR LEATHER SPLITTING MACHINES.
APPLICATION FILED MAY 18, 1906.
2 SHEETS—SHEET 2.
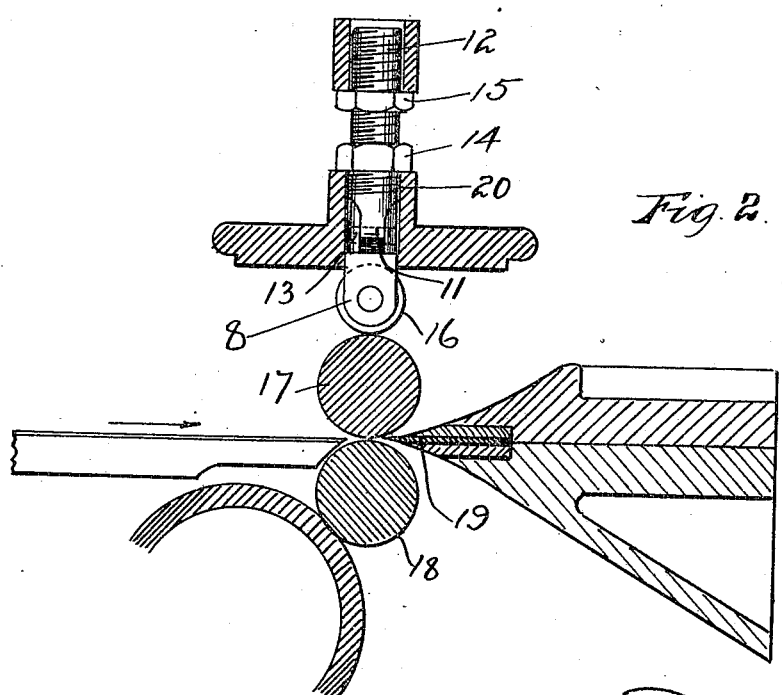
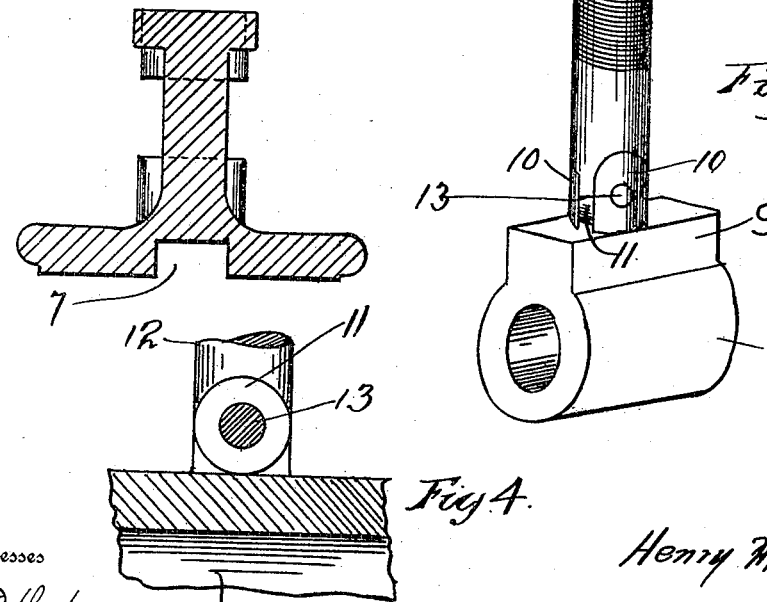
Witnesses
E. D. Ogden
A. L. Makepeace
Inventor
Henry M Smith
By Howard E Barlow
Attorney

UNITED STATES PATENT OFFICE.

HENRY M. SMITH, OF TAUNTON, MASSACHUSETTS, ASSIGNOR TO CHARLES H. MEADER, OF DORCHESTER, MASSACHUSETTS.

ADJUSTABLE BEARING FOR LEATHER-SPLITTING MACHINES.

No. 838,472.     Specification of Letters Patent.     Patented Dec. 11, 1906.

Application filed May 18, 1906. Serial No. 317,534.

*To all whom it may concern:*

Be it known that I, HENRY M. SMITH, a citizen of the United States, residing at the city of Taunton, in the county of Bristol and State of Massachusetts, have invented certain new and useful Improvements in Adjustable Bearings for Leather-Splitting Machines, of which the following is a specification, reference being had therein to the accompanying drawings.

This invention relates to adjustable bearings for tension or backing rolls in leather-splitting machines, and has for its object to provide a bearing that is pivotally hung to automatically adapt itself to a longitudinal alinement and also to provide means in said bearing whereby the same may be adjusted vertically.

A further object of the invention is to provide a beam for the reception of these bearings and also to provide means in said beam by which quick and accurate transverse alinement of all the bearings held therein may be obtained.

The backing-rolls in a leather-splitting machine are for the purpose of backing up or stiffening the long gage-roll and prevent the same from springing when the hide is being carried through the machine. This gage-roll is adjustably held to accurately control and determine the thickness of the leather to be split from the hide, the splitting of which is accomplished by means of the usual band-knife employed for this purpose. The backing-rolls necessarily work under a great strain, and the boxes in which they run wear quickly and are obliged to be changed or renewed frequently. Then again in practice these bearings are required to be adjusted frequently to set the gage-roll for every change in thickness of leather to be split. It has heretofore been found a rather difficult matter to set or adjust these bearings and always maintain the perfect alinement necessary, so that the rolls would run freely therein and not cramp or bind, and each time the roll was adjusted it required an expenditure of considerable time and labor to reset the same and to get them into the proper alinement again.

To obviate the above difficulties, I have constructed a bearing with a rectangular upper portion having straight sides and pivoted to the said upper portion of this box a threaded stem that extends upward into the beam, which stem is controlled in its vertical adjustment by means of lock-nuts threaded thereon. The rectangular portion of these boxes are adapted to engage a corresponding slot or channel in the cross-head beam, which is planed to run, preferably, the entire length of the same. By this method the boxes may be instantly brought to perfect alinement laterally, and by the pivoting of this box in its supporting-stem the roll adjusts itself automatically to the longitudinal alinement, thereby rendering it practically impossible to set the bearings so that the rolls will come other than in perfect alinement in all directions, thus greatly reducing the cost of setting up and also the cost of operating the machine.

The invention is fully set forth in this specification and more particularly pointed out in the appended claims.

In the accompanying drawings, Figure 1 is a side elevation of the machine, illustrating the position of the backing-rolls on the gage-roll, said backing-rolls being supported in their adjustable bearings. Fig. 2 is an elevation in section through the cross-head at one of the stem-bearings, showing the operating-rolls and a section of the splitting-knife. Fig. 3 is a detail perspective view of one of the bearings, illustrating the stem as pivotally held therein. Fig. 4 is a side elevation showing a detail of the pivoted bearing. Fig. 5 is a section of the cross-head beam, illustrating the groove or channel therein which is adapted to receive the upper rectangular portion of the box. Fig. 6 is a modification showing the lower portion of the beam with downwardly-extending grooved bosses for the purpose of receiving the boxes.

Referring to the drawings, at 1 1 are the side frames of the machine, between which frames is fixed the cross-head beam 2. This beam is provided at intervals with bosses 3 and 4, which have a hole 6 through them for the purpose of receiving the stem of the bearing hereinafter described. Between the upper and lower bosses the beam is provided with a space 5, in which the adjusting-nuts are operated. Into the lower face of this beam is planed a channel or groove 7 for the reception of each of the said bearings. This groove is preferably finished and brought in perfect alinement by means of a continuous stroke of the planer, which stroke extends the entire length of all the bearings, forming one continuous channel, or this channel might be formed through a series of bosses or blocks extending downward from the beam at the desired intervals, as illustrated at Fig. 6, and having the channel planed in each one for the reception of its own individual bearing. These could also be brought into perfect alinement by a continuous stroke of the planer passing through them all, or any tongue-and-groove means may be employed for producing this lateral alinement without departing from the spirit and scope of my invention.

The journal-boxes 8, as illustrated in Fig. 3, are provided with an upwardly-extending rectangular portion 9, having straight sides, which portion is of a width equal to the groove 7 in the beam. Extending upwardly from this rectangular portion are ears 10 10, between which a reduced portion 11 of the threaded stem 12 is held to work on the pivot 13. At 14 and 15 are adjusting lock-nuts by which the said bearing is raised or lowered in the beam to adjust its backing-roll 16 into proper contact with the gage-roll 17.

In the operation of the machine the hides are passed in the direction of the arrow between the gage-roll 17 and the ring-roll 18 and are split or skived by the knife 19 peeling off a thin sheet from the upper face of the leather, the thickness of which is determined by the accurate positioning of the gage-roll 17. This gage-roll is controlled in its adjustment by the backing-roll 16 through its adjustable boxes 8 8.

In assembling the parts the holes 20 in the beam are made a little larger than the stems 12 of the boxes, so that said stems may have some play and a free vertical adjustment therein. By this construction the channel in the beam is depended upon alone for the lateral alinement of the box, it being found impractical to obtain the result desired by the use of the holes alone. The straight sides of the boxes are fitted closely into the channel portion of the beam, so that when said boxes are drawn into position by means of the nuts 14 and locked by the nut 15 all the boxes are in perfect lateral alinement one with the other throughout the length of said beam and cannot be inadvertently moved from such alinement. Two backing-rolls are shown in this machine; but three or more may be used, if desired, according to the width of the same. It will be seen by this construction that the necessary vertical adjustment of these backing-rolls may be readily obtained by simply adjusting the lock-nuts 14 and 15, thereby raising and lowering the boxes in the channel and yet always maintaining the same perfect alinement. Then, again, by pivoting these boxes in the stem it is impossible to cramp or bind the bearings if one should be set down a trifle harder than the other, thus insuring a perfectly free running roll. By this construction the setting and adjusting of these boxes is greatly facilitated and much time and expense are saved in the operating of the machine.

Having thus described my invention, what I claim as new, and desire to secure by Letters Patent, is—

1. A device of the character described, comprising a beam, a bearing, means whereby said bearing may be adjusted vertically in said beam, means in said bearing whereby it will automatically adjust itself to longitudinal alinement, and means in the beam for engaging the bearing to bring it into alinement laterally.

2. A device of the character described, comprising a beam, a plurality of bearings supported from said beam each of said bearings being provided with a threaded stem held to be vertically adjusted in said beam, means whereby each of said bearings will automatically adjust itself to longitudinal alinement, and means in the bearing adapted to engage the beam to bring them all in lateral alinement.

3. A device of the character described, comprising a beam, a bearing, means whereby said bearing may be adjusted vertically in said beam, said bearing being pivotally held whereby it will automatically adjust itself to longitudinal alinement, and means whereby the bearing is brought into alinement laterally.

4. A device of the character described, comprising a beam, a bearing, means whereby said bearing may be adjusted vertically in said beam, said bearing being pivotally held whereby it will automatically adjust itself to longitudinal alinement and means in the beam for engaging the bearing to bring it into lateral alinement.

5. A device of the character described, comprising a beam, said beam being provided with a channel or groove, one or more bearings, means whereby said bearings may be adjusted vertically in said beam, means in said bearings whereby they will automatically adjust themselves to longitudinal alinement and means also in each bearing for engaging the said channel in the beam whereby the bearings in said beam are brought to lateral alinement.

6. A device of the character described, comprising a beam, said beam being provided with a groove or channel, bearings supported from said beam, means whereby said bearing may be adjusted vertically in said beam, each of said bearings being pivotally held whereby they will automatically adjust themselves to longitudinal alinement, and means also in said bearing for engaging said groove or channel in the beam whereby they will be brought into lateral alinement.

7. A device of the character described, comprising a beam, said beam being provided with a channel, a plurality of bearings supported from said beams each of said bearings being provided with a threaded stem extending into said beam, nuts on said stem by which the bearing is vertically adjusted in said beam each bearing being pivotally held on its stem whereby it will automatically adjust itself to longitudinal alinement, and an extension on said bearing adapted to engage the channel in said beam whereby the boxes held therein are brought in lateral alinement one with the other.

In testimony whereof I affix my signature in presence of two witnesses.

HENRY M. SMITH.

Witnesses:
HOWARD E. BARLOW,
C. H. MEADER.